(12) United States Patent
Olds et al.

(10) Patent No.: US 6,691,274 B1
(45) Date of Patent: Feb. 10, 2004

(54) METHOD FOR ERROR CORRECTION IN A COMMUNICATION SYSTEM

(75) Inventors: Keith Andrew Olds, Mesa, AZ (US); Kenneth M. Peterson, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/442,549

(22) Filed: Nov. 18, 1999

(51) Int. Cl.⁷ .............................................. H03M 13/00
(52) U.S. Cl. ...................................................... 714/752
(58) Field of Search ................................. 714/752, 758, 714/746, 784

(56) References Cited

U.S. PATENT DOCUMENTS

| | | | | |
|---|---|---|---|---|
| 6,157,642 A | * | 12/2000 | Sturza et al. ................ | 370/389 |
| 6,202,189 B1 | * | 3/2001 | Hinedi et al. ................ | 714/786 |
| 6,215,776 B1 | * | 4/2001 | Chao ........................... | 370/316 |
| 6,263,466 B1 | * | 7/2001 | Hinedi et al. ................ | 714/755 |
| 6,301,231 B1 | * | 10/2001 | Hassan et al. .............. | 370/316 |

FOREIGN PATENT DOCUMENTS

| | | | |
|---|---|---|---|
| EP | 0772317 | 5/1997 | ............. H04L/1/00 |
| WO | 9919994 | 4/1999 | ............ H04B/7/00 |

\* cited by examiner

*Primary Examiner*—Albert Decady
*Assistant Examiner*—Esaw Abraham
(74) *Attorney, Agent, or Firm*—Frank J. Bogacz

(57) ABSTRACT

Information packets are error encoded for transmission through a communication channel (34) in a communication system (10) using a variable payload outer code and a common physical layer inner code. The variable payload outer code is selected for each packet based upon an application or service associated with the packet. Thus, less coding can be used for packets associated with error tolerant applications and more coding can be used for packets associated with error sensitive applications. A common header outer code is also used for the packets. The variable payload outer code is preferably applied at the system adaptation level within an interworking function (22, 24) in the communication system (10). The common header outer code and the common physical layer inner code are preferably applied at the data link layer.

15 Claims, 3 Drawing Sheets

US 6,691,274 B1

METHOD FOR ERROR CORRECTION IN A COMMUNICATION SYSTEM

FIELD OF THE INVENTION

The invention relates generally to communication systems and, more particularly, to techniques for providing error detection/correction in packet-based communication systems.

BACKGROUND OF THE INVENTION

Noisy communication channels, such as satellite uplink and downlink channels and terrestrial microwave channels, typically require the use of error correction coding to maintain a low bit error rate (BER) through the channel. Low BERs are required by certain communication applications to achieve a desired level of communication quality in the system. Some communication applications, however, are more tolerant of bit errors in the channel and can thus perform adequately using less coding than other applications. For example, applications involving video conferencing, high definition television (HDTV), Moving Picture Experts Group (MPEG) video, and vocoded voice can generally perform at higher BERs than other applications before the quality of the communication becomes intolerable.

Modern communication systems, most notably wireless systems, typically use a fixed amount of error correction coding within their communication links. Thus, when these systems are used to support multiple communications applications (e.g., voice, video, computer data, etc.), a level of error correction coding must be used that is capable of achieving at least a minimum acceptable performance level for applications that are least error tolerant. Thus, for more error tolerant applications, a higher coding rate is used than is required to achieve an acceptable or negotiated performance level. This "higher than needed" error coding rate results in a "lower than possible" throughput for the more error tolerant applications. In many such applications, however, it is desirable to achieve increased communication throughput at the expense of communication accuracy.

Therefore, there is a need for a method and apparatus that is capable of dynamically varying an error coding rate used in a communication channel based on varying system needs.

DETAILED DESCRIPTION OF A PREFERRED EMBODIMENT

The present invention relates to a packet-based communication system architecture that uses variable code tunneling to achieve a dynamic tradeoff between error coding rate and throughput in a multi-application environment. The invention recognizes that some communication applications are more error tolerant than others and thus a variable amount of error coding is used in the system, on a packet by packet basis, to provide for error detection and/or correction. In a preferred embodiment, a multi-level error coding scheme is used that concatenates a variable, application-specific payload outer code with a common physical layer inner forward error code (FEC). A common header outer code is also preferably used to encode the packet headers in the system.

Because the payload outer code is variable, it can be tailored to the particular application or service being performed or provided. Thus, greater control over the throughput/error rate tradeoff is achieved. The principles of the present invention can be advantageously implemented in any multiple-application, packet-based communication system and are particularly beneficial in satellite-based communication systems.

Figure 1:
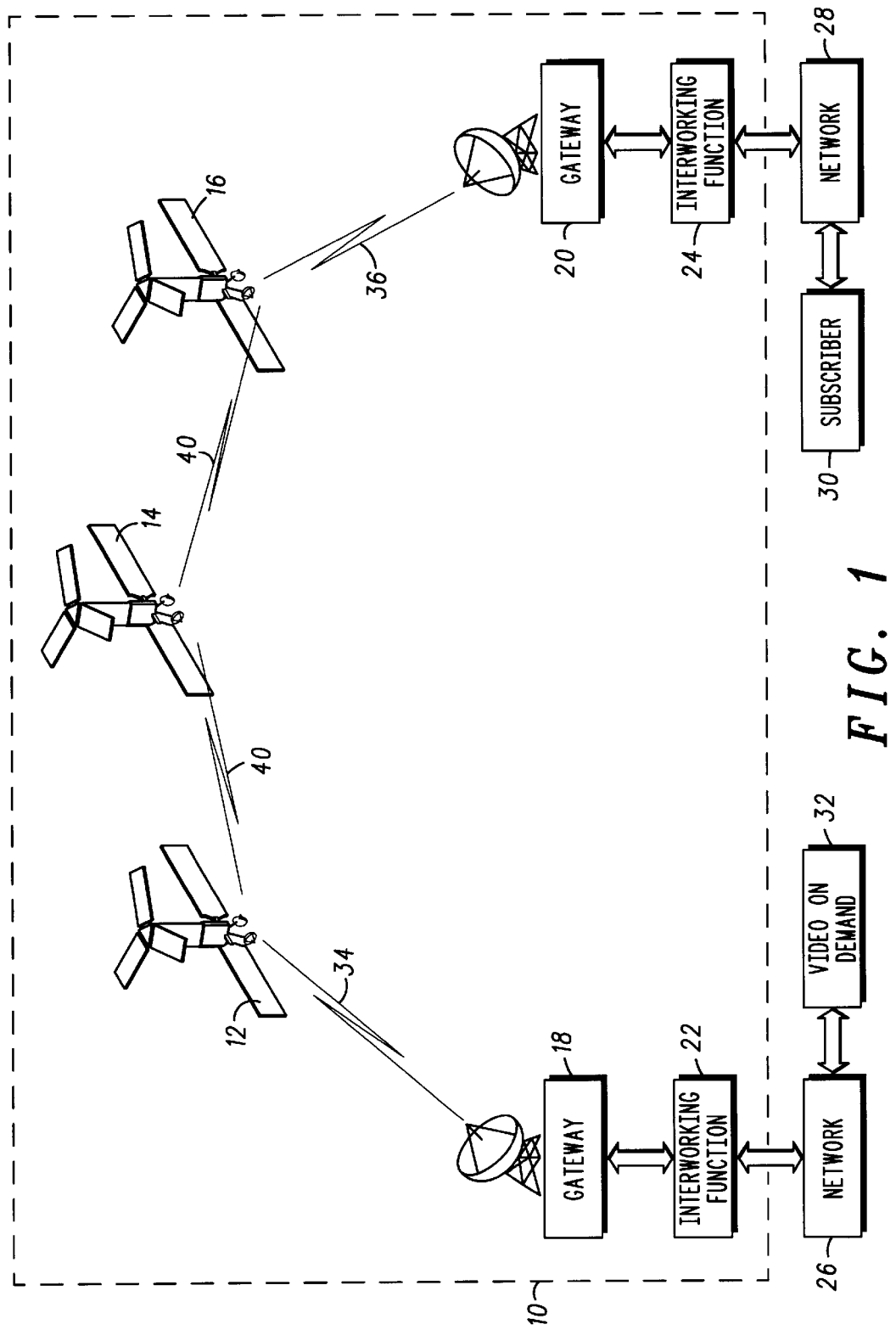
FIG. 1 is a block diagram illustrating a satellite communication system in accordance with one embodiment of the present invention.

FIG. 1 is a block diagram illustrating a satellite communication system 10 in accordance with one embodiment of the present invention. As illustrated, the satellite communication system 10 includes: a plurality of communication satellites 12, 14, 16; a plurality of satellite gateways 18, 20; and a plurality of service interworking functions 22, 24. Each interworking function 22, 24 is coupled to at least one external communication network 26, 28 to provide communications services to users of the external networks 26, 28 through the satellite system 10. For example, as shown in FIG. 1, a subscriber 30 coupled to network 28 can communicate with a video-on-demand service provider 32 coupled to network 26 through the satellite communication system 10. Any number of other communication connections between remote communication entities can also be provided through the satellite communication system 10.

The communication satellites 12, 14, 16 are preferably part of a larger constellation of communication satellites that provide communications coverage over an extended portion of or the entire earth's surface. The individual satellites 12, 14, 16 each operate as switching nodes in a large communication network that are used for directing communications signals (e.g., information packets) along predetermined communication routes through the satellite system 10. In a typical scenario, a first communication entity (e.g., subscriber 30) will request a communication connection with a second, remote communication entity (e.g., video-on-demand service provider 32) through the satellite communication system 10. A communication route through the satellite system 10 is then established for the connection and the corresponding information packets are delivered between the communication entities via that route (using, for example, routing information appended to the information packets) for the duration of the connection. Occasionally, route changes need to be made during a connection (e.g., due to node failures or satellite handoffs) in which case the routing information within the packets needs to be modified.

The satellite gateways 18, 20 are nodes at the edge of the satellite communication system 10 that each provide a connection between the system 10 and one or more external communication networks (e.g., networks 26 and 28) or other external communication entities. The satellite gateways 18, 20 are typically housed within stationary terrestrial-based communication facilities, although ground mobile, airborne, ship-based, and space-based gateways are also possible. The satellite gateways 18, 20 each include at least one satellite transmitter and at least one satellite receiver for use in supporting a wireless communication link (e.g., a satellite uplink/downlink) with a satellite in the constellation. The satellite gateways 18, 20 will normally be distributed throughout the coverage region of the satellite system 10 so that a relatively large number of geographically diverse system entry points are available.

Any number of different external network types can have access to the satellite system 10 through a particular gateway 18, 20. For example, in a typical system, a public switched telephone network (PSTN) will be coupled to a satellite gateway so that users of the PSTN can place calls through the satellite system 10 when required. Other possible types of external network include: local area networks (LANs), wide area networks (WANs), municipal area networks (MANs), the Internet, external ATM networks, cable television networks, synchronous optical networks (SONET), integrated services digital networks (ISDN), terrestrial wireless networks, and/or other types of communication networks. The type of external network through which a user connects to the satellite system 10 will generally dictate the type of services that the user can access using the system 10. For example, broadband services, such as video-on-demand services, will generally require a broadband network. In addition to the above, the gateways 18, 20 can also provide for direct communication between external communication entities (e.g., individual subscribers or service providers) and the satellite communication system 10 without the use of an intervening network 26, 28.

The interworking functions 22, 24 represent functionality that is used to provide for interoperability between the satellite system 10 and communication entities outside the system. That is, the interworking functions 22, 24 provide, among other things, the protocol conversions that are necessary to mask differences in physical, link, and network configurations between the system 10 and the external entities (e.g., networks 26 and 28). In a satellite communication system, as illustrated in FIG. 1, the interworking functions 22, 24 are typically co-located with or part of the corresponding satellite gateways 18, 20, which may contain a large number of different functions for use with various external entity types. Alternatively, or in addition, the interworking functions 22, 24 can be located outside of the satellite system 10 as part of an external network (e.g., network 26) or other communication entity (e.g., service provider 32) or as a standalone node between the gateway and the external network. The interworking functions 22, 24 normally include both hardware and software elements and, in an asynchronous transfer mode (ATM) environment, are characterized as part of the ATM adaptation level.

To increase the quality of communication through the satellite system 10, communication signals in the system 10 are error coded so that bit errors that occur within the various links of the system 10 can be detected and preferably corrected. Various forms of error coding are available for use within the links of the system 10, including both error detection codes and error correction codes. In general, an error code will add redundant information to a communication signal that allows a future recipient of the signal to determine, at a minimum, whether bit errors (up to a predetermined number) have occurred in transit. Preferably, the code will also allow up to a predetermined number of bit errors to be corrected in a signal. Typically, the more redundant information that a code adds to a communication signal, the greater the code's ability to detect and/or correct errors in the signal down the line. The ratio of the number of information bits in a communication signal to the overall number of bits in the encoded signal is known as the code rate. Thus, a more powerful code will normally have a lower code rate than a less powerful one.

In accordance with the present invention, a variable payload outer code is concatenated with a common physical layer inner code to provide error control within a communication channel. The variable payload outer code is applied on a packet by packet basis and is preferably related to the application or service associated with the individual packet. The common inner code is applied to all packets being transferred on a particular physical link and does not change based on application. In addition, in a preferred embodiment, a common header outer code is applied to the headers of all packets being transferred on the link. It should appreciated that the terms "packet", "information packet", and "data packet", as used herein, refer to any small information unit that is transferred within a communication system, regardless of system protocol or layer.

With reference to FIG. 1, in one embodiment of the present invention, the variable payload outer code is added to the incoming packets by the interworking function associated with the corresponding service or application (e.g., interworking function 22 associated with the video-on-demand service 32). The type of coding applied to each incoming packet by the interworking function will depend upon the corresponding service or application. Often, a particular interworking function in the system 10 will be dedicated to use with a particular service or application type and will thus be programmed to use a single payload error code for all received packets. Alternatively, a single interworking function can be used to process packets associated with various different applications/services and will thus require functionality for identifying the application/service associated with a received packet and selecting an appropriate error code (or no code) from a plurality of available codes. Using this variable payload code approach allows less coding to be used for error tolerant services/applications and more coding to be used for error sensitive services/applications.

In addition, the level of payload error coding used for a particular packet can also be made dependent upon a quality-of-service (QOS) negotiated between a service subscriber and a service provider. Thus, a more powerful payload error code can be applied to communication packets associated with subscribers that have contracted for a high QOS while a weaker code, or no code, is applied to packets associated with subscribers that have contracted for a lower QOS.

After the incoming packets have been appropriately processed and coded within the interworking functions associated with a gateway, the packets are transferred to the gateway for additional processing. For example, packets processed and encoded within interworking function 22 (and other interworking functions associated with gateway 18) are transferred to gateway 18 after processing within the interworking functions has completed. In the gateway 18, a header is generated for each of the received packets in a typical fashion. The header generated for each packet can include multiple header fields created at different system layers within the gateway 18. For example, user address and route address fields can be generated at the network layer and a data link control (DLC) field can be generated at the data link layer. The headers for all of the packets to be uplinked by the gateway 18 to the satellite 12 are encoded at the data link layer using a common error code. In a preferred embodiment, a Reed-Solomon error correction code is used as the common header outer code, although many other alternative codes can also be used.

After the headers have been encoded, they are appended to the encoded payload from the interworking function without disturbing the payload contents or formats. The resulting packets are interleaved into a packet stream for delivery to satellite 12 via the satellite uplink. The packet stream is encoded using a common inner error correction code at the data link layer within the gateway 18, converted to a radio frequency signal (at the established uplink frequency), and transmitted to the satellite 12. In a preferred embodiment, the inner code is a convolutional code, but those skilled in the art will appreciate that other inner codes could be used in the alternative.

The radio frequency signal is received by the satellite 12 and converted to a baseband representation within the satellite 12. The encoded packet stream is then decoded by removing the inner error coding and making any necessary bit error corrections. The individual packets within the packet stream are then de-interleaved and the packet headers are decoded and any necessary header error corrections are made. The resulting packets having decoded headers and encoded payload portions are then each routed through the satellite network in accordance with routing information within the corresponding header. In a preferred embodiment, low error rate laser inter-satellite links 40 are used between the satellites 12, 14, 16 of the system 10 that do not require additional error coding to be applied.

When a packet reaches the appropriate downlink satellite in the system 10, the header of the packet is again encoded with the common header error code. For example, packets being delivered from the video-on-demand service provider 32 to the subscriber 30 through the satellite system 10 will have satellite 16 as the downlink satellite. Thus, when such a packet reaches satellite 16, the header of the packet will be encoded using the common header outer code. After the header has been encoded, the packet is interleaved with other packets to be downlinked to the gateway 20 and the resulting packet stream is encoded using the common convolutional error correction code. The encoded packet stream is then converted to a radio frequency signal (at the established downlink frequency) and transmitted to the gateway 20.

Upon reception, the gateway 20 converts the radio frequency signal from satellite 16 to a baseband representation, removes the convolutional inner code, de-interleaves the packets in the packet stream, and decodes the headers of the individual packets. The gateway 20 then determines the ultimate destination of each packet using the corresponding decoded header information and delivers each packet to an appropriate interworking function which removes the payload outer code from the packet. The decoded packets are then transferred to their intended destinations via an external network or by direct link therewith. For example, a packet being delivered from the video-on-demand service provider 32 to the subscriber 30 would be decoded by interworking function 24 and then transferred to the subscriber 30 via network 28. Address information within the header of the packet would be used within the network 28 to identify the subscriber 30 as the intended destination.

Figure 2:
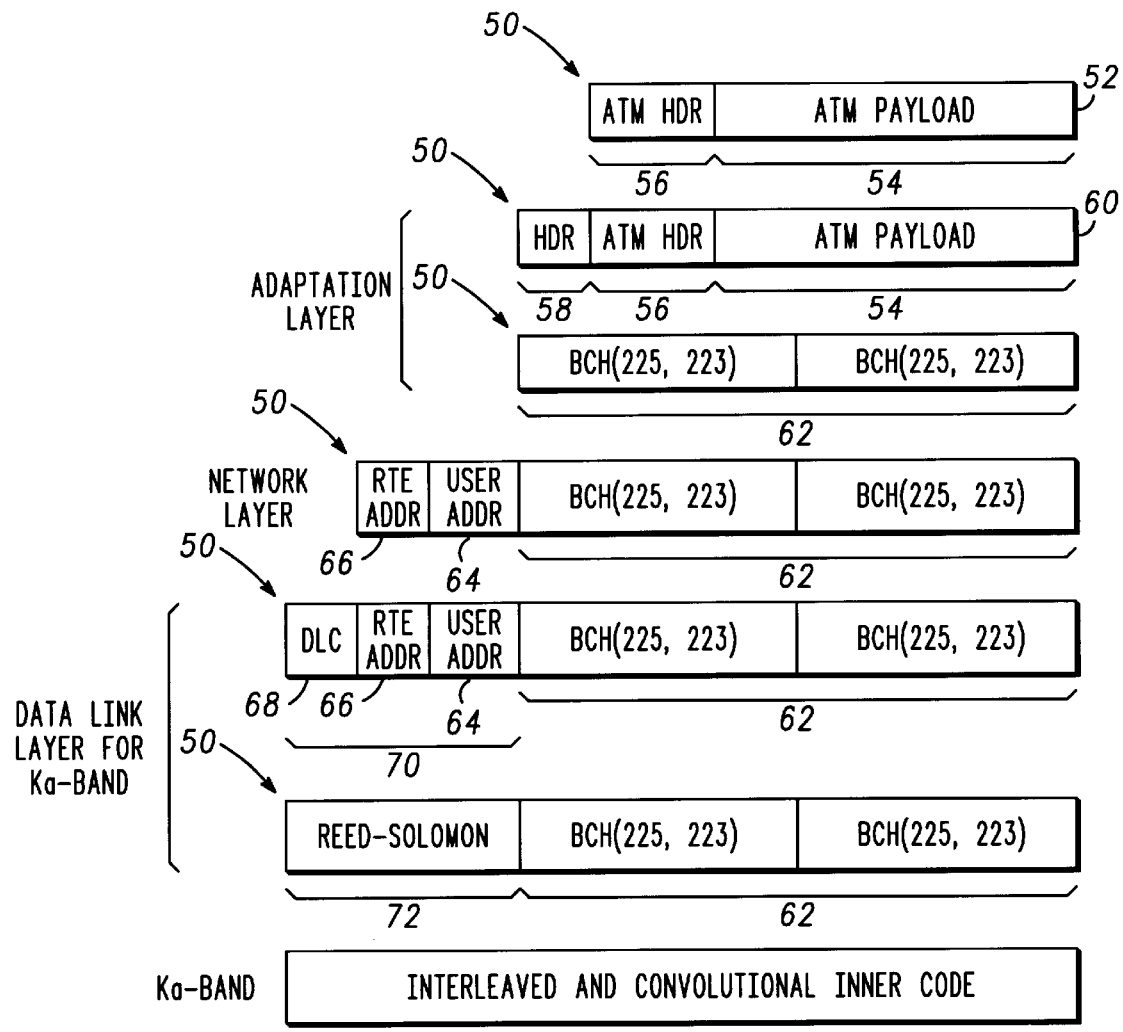
FIG. 2 is a diagram illustrating various encoding stages of an information packet in accordance with one embodiment of the present invention.

FIG. 2 is a diagram illustrating the various coding stages undergone by an information packet 50 within system 10 of FIG. 1 before the packet 50 is uplinked to a satellite. For the following discussion, it will be assumed that the service provider 32 (see FIG. 1) is delivering a packet to the remote subscriber 30 via the system 10. It will also be assumed that the network 26 through which the provider 32 communicates with the system 10 is an ATM-based network. With reference to FIG. 2, an ATM cell 52 having an ATM payload portion 54 and an ATM header portion 56 is received by the interworking function 22 for delivery to the subscriber 30. The interworking function 22 adds an adaptation layer header 58 to the ATM cell 52 to form an augmented cell 60 at the adaptation layer. The purpose of the adaptation layer header 58 is to establish which set of transport services is used by a particular connection. The augmented cell 60 is then encoded by the interworking function 22 using an error code that is selected based upon the application or service associated with the ATM cell 52 (e.g., video transmission in the case of cells received from video-on-demand service provider 32) to generate encoded payload 62. For example, as illustrated in FIG. 2, a Bose-Chaudhuri-Hochquenghem (BCH) code was selected to encode the augmented cell 60 in the illustrated embodiment.

A user address header field 64 and a route address header field 66 are next added to the encoded payload 62 at the network layer and a DLC field 68 is added at the data link layer. The full packet header 70 consisting of the user address header field 64, the route address header field 66, and the DLC field 68 is next encoded within the data link layer using the common header outer code to generate encoded header 72. In the preferred embodiment, the same header outer code is used to encode the headers of all of the packets to be uplinked to the satellite 12. In the illustrated embodiment, a Reed-Solomon (RS) error correction code is used as the common header outer code. The packet 50 is next interleaved with the other packets to be uplinked to satellite 12 and the resulting packet stream is encoded with a convolutional error code. The encoded packet stream is then upconverted and transmitted to the satellite 12 via wireless satellite uplink.

Figure 3:
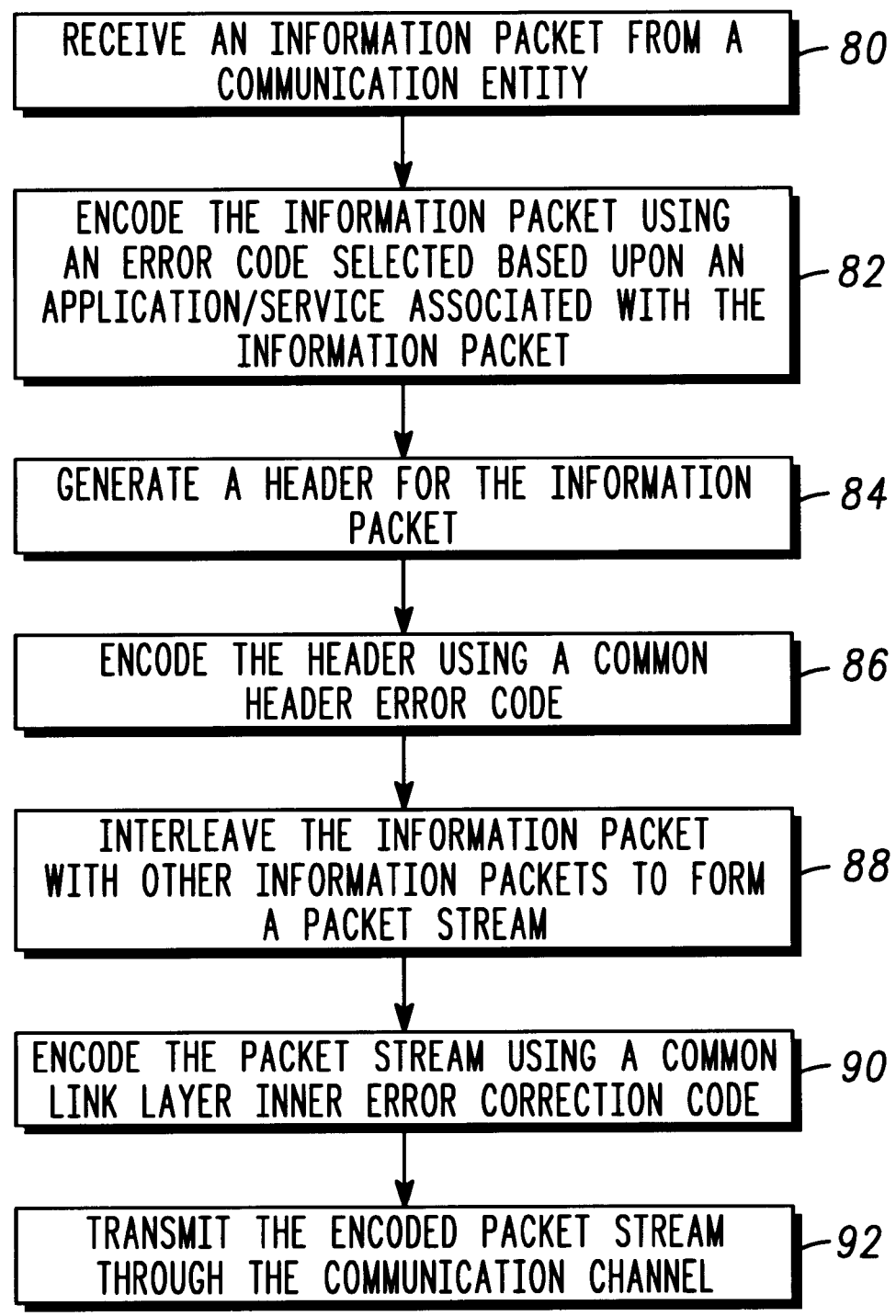
FIG. 3 is a flowchart illustrating a method for encoding an information packet before transferring the packet through a communication channel in accordance with one embodiment of the present invention.

FIG. 3 is a flowchart illustrating a method for encoding an information packet before transmitting the packet through a communication channel in accordance with one embodiment of the present invention. The communication channel can include any type of channel that requires error coding to ensure an adequate level of communication quality, such as a satellite uplink/downlink, a terrestrial wireless link, or a wired connection between communication nodes. First, an information packet to be transmitted through the communication channel is received from a communication entity (step 80). Next, the information packet is encoded using an error code that is selected based upon an application/service associated with received information packet (step 82). Often, the application/service associated with the packet will be evident from the communication entity from which it was received. Then, in a pair of optional steps, a header is generated for the information packet (step 84) and the header is encoded using a header code that is common to all packets to be transmitted through the communication channel (step 86). The information packet is then interleaved with other information packets to be transmitted through the communication channel to form a packet stream (step 88). The packet stream is next encoded using a common inner error correction code (step 90) and the encoded packet stream is transmitted through the communication channel (step 92).

Although the present invention has been described in conjunction with its preferred embodiments, it is to be understood that modifications and variations may be resorted to without departing from the spirit and scope of the invention as those skilled in the art readily understand. In particular, it should be appreciated that the inventive principles are not limited to use within a satellite communication system. As those skilled in the art will recognize, the inventive tunneling code techniques can be applied to any transport network intended to transport a variety of services with different quality of service requirements. It is particularly applicable to networks containing a number of wireless connections, such as a terrestrial microwave or optical network. Such modifications and variations are considered to be within the purview and scope of the invention and the appended claims.

What is claimed is:

1. A method for use in managing communications within a packet-based satellite communication system having a constellation of communication satellites and a plurality of satellite gateways, each of said plurality of satellite gateways for providing a communication link between at least one external communication entity and said constellation of communication satellites, said method comprising the steps of:

receiving an information packet from a first communication entity, said information packet to be delivered to a second communication entity via the constellation of communication satellites;

encoding said information packet using a first error code to generate an encoded information packet, said first error code being related to an attribute of said information packet;

interleaving said encoded information packet with other encoded information packets at a first satellite gateway to generate a packet stream;

applying a common inner error correction code to said packet stream to generate an encoded packet stream;

transmitting said encoded packet stream from said first satellite gateway to a first communication satellite within said constellation of the communication satellites via a wireless communication link; and said first error code is selected based upon an application associated with said information packet;

said first error code is selected based upon a quality of service associated with said information packet;

said first error code is selected based upon a request from one of said first communication entity and said second communication entity; and said first error code can include no error code;

receiving and decoding said encoded packet stream at said first communication satellite, said step of decoding including correcting errors in said encoded packet stream using said common inner error correction code when errors are present in said encoded packet stream;

de-interleaving said encoded information packet from said packet stream within said first communication satellite; and transferring said encoded information packet to a second satellite in said constellation of communication satellites in accordance with a predetermined packet route.

2. The method, as claimed in claim 1, wherein:

said steps of receiving and encoding are performed as part of an interworking function associated with said first satellite gateway.

3. The method, as claimed in claim 2, wherein:

said interworking function is located within said first satellite gateway.

4. The method, as claimed in claim 1, further comprising the steps of:

generating a first header for said encoded information packet;

generating second headers for said other encoded information packets;

encoding said first header and said second headers using a common error code to generate encoded headers; and appending said encoded headers to corresponding encoded information packets before said step of interleaving.

5. The method, as claimed in claim 1, wherein:

said first communication entity includes an information service provider and said second communication entity includes a service subscriber, wherein said information packet is associated with a service being provided to said service subscriber by said information service provider.

6. The method, as claimed in claim 1, further comprising the steps of:

receiving said encoded information packet at a downlink satellite in said constellation of communication satellites;

interleaving said encoded information packet with other information packets within said downlink satellite to form a second packet stream;

applying said common inner error correction code to said second packet stream to generate a second encoded packet stream; and transmitting said second encoded packet stream from said downlink satellite to a second satellite gateway via a second wireless communication link.

7. The method, as claimed in claim 6, further comprising the step of:

receiving and second decoding said second encoded packet stream at said second satellite gateway, said second decoding step including correcting errors in said second encoded packet stream using said common inner error correction code when errors are present in said second encoded packet stream.

8. The method, as claimed in claim 7, further comprising the steps of:

de-interleaving said encoded information packet from said second packet stream within said second satellite gateway; and decoding said encoded information packet based on said first error code to recover said information packet.

9. The method, as claimed in claim 8, wherein:

said step of decoding said encoded information packet includes correcting errors in said encoded information packet using said first error code.

10. The method, as claimed in claim 8, wherein:

said step of decoding said encoded information packet is performed as part of an interworking function associated with said second satellite gateway.

11. The method, as claimed in claim 1, wherein:

said common inner error correction code includes a convolutional code.

12. In a satellite communication system having a plurality of communication satellites for providing communication services to a plurality of external communication entities, a method for processing information packets comprising the steps of:

receiving information packets to be transferred through the satellite communication system, each of said information packets being encoded with a payload error code that is related to an application associated with the information packet;

generating a header for each of said information packets;

encoding the header of each of said information packets using a header error code that is based upon an application associated with the information packets;

interleaving said information packets into a packet stream for delivery to a communication satellite via a wireless communication link;

encoding said packet stream using a common physical layer forward error code (FEC) to generate an encoded packet stream;

transmitting said encoded packet stream to said communication satellite via said wireless communication link;

said header error code includes a Reed-Solomon error correction code;

said common physical layer forward error code (FEC) includes a convolutional code;

decoding said encoded packet stream at said communication satellite, said step of decoding including correcting errors within said encoded packet stream when errors are present;

de-interleaving said information packets in said packet stream at said communication satellite;

decoding a header of each information packet at said communication satellite; and delivering a first of said information packets from said communication satellite to a destination location; and decoding said first information packet at said destination location based on a corresponding payload error code.

13. The method, as claimed in claim 12, wherein:

said step of receiving information packets includes receiving information packets from at least one interworking function.

14. The method, as claimed in claim 12, wherein:

said at least one interworking function is operative for encoding each of said information packets using a corresponding payload error code.

15. The method, as claimed in claim 12, wherein:

said destination location includes an interworking function associated with a destination node.

\* \* \* \* \*